Sept. 13, 1966　　　　　　　A. H. SWAN　　　　　3,272,678
APPARATUS FOR THE MANUFACTURE OF HOSE BY HELICALLY WINDING AN
ELONGATED STRIP OF PLASTIC MATERIAL
Filed Feb. 15, 1962　　　　　　　　　　　　　2 Sheets-Sheet 1

INVENTOR.
ALFRED H. SWAN
BY Lyon & Lyon
ATTORNEYS

INVENTOR.
ALFRED H. SWAN
BY Lyon+Lyon
ATTORNEYS

United States Patent Office 3,272,678
Patented Sept. 13, 1966

3,272,678
APPARATUS FOR THE MANUFACTURE OF HOSE BY HELICALLY WINDING AN ELONGATED STRIP OF PLASTIC MATERIAL
Alfred H. Swan, Newport Beach, Calif., assignor, by mesne assignments, to Air Reduction Company, Incorporated, a corporation of New York
Filed Feb. 15, 1962, Ser. No. 173,399
2 Claims. (Cl. 156—429)

This invention relates to hose-making machines, and included in the objects of this invention are:

First, to provide a hose-making machine which is adapted to form the hose continuously from one end; that is the components of the hose are fed tangentially onto a rotating mandrel and are then caused to wrap about the mandrel as well as move axially thereon, and upon being formed into the completed hose move axially from the mandrel.

Second, to provide a hose-making machine which is particularly simple in construction, requiring a minimum of parts, yet which is capable of producing hose at a high rate.

Third, to provide a hose-making machine wherein the steps in the making of the hose are readily observed, so that any malfunctioning of the machine or defects in the material comprising the hose may be readily observed and correction made, thereby to minimize production of defective hose.

Fourth, to provide a hose-making machine which is particularly adapted for manufacturing hose of plastic materials in which the hose includes a helically wound core over which is helically wrapped one or more laminations of a plastic tape.

With the above and other objects in view, as may appear hereinafter, reference is directed to the accompanying drawings in which.

Figure 1:
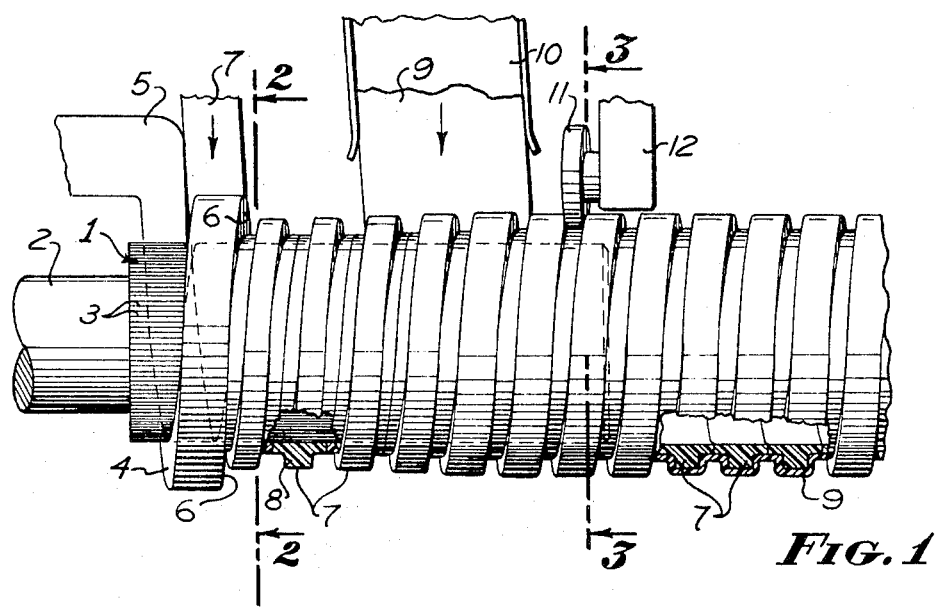
FIGURE 1 is a fragmentary, side view of one form of the hose-making machine showing a hose in the process of being manufactured thereon, portions of the hose being broken away and in section.
Figure 2:
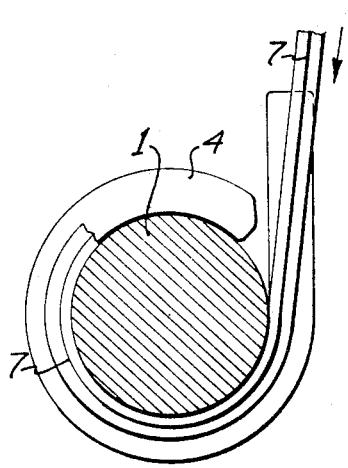
FIGURE 2 is a fragmentary, transverse, sectional view through 2—2 of FIGURE 1.
Figure 3:
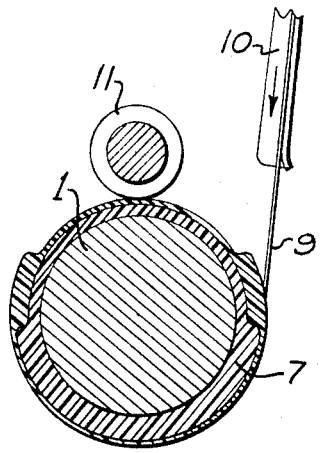
FIGURE 3 is a fragmentary, transverse, sectional view taken through 3—3 of FIGURE 1.

Reference is first directed to FIGURES 1 through 3. The hose-making machine here illustrated includes a cylindrical mandrel 1 supported at one end by a shaft 2, which in turn is suitably supported in bearings, not shown, and connected with drive means for the purpose of rotating the shaft 2 and mandrel 1. The mandrel 1 is preferably provided with longitudinally extending knurls 3.

Wrapped around one end of the mandrel 1 is a rigid guide helix 4 having an internal diameter slightly greater than the mandrel 1 so that the mandrel rotates freely therein. The guide helix 4 is suitably supported by a bracket 5 from the frame work of the machine, not shown. The guide helix 4 presents a helical face 6 directed toward the extended end of the mandrel 1.

The pitch of the helical face 6 determines the pitch of the helical wrappings which form the hose made on the machine. While the machine may be utilized in the manufacture of different types of hose having helically wrapped components, it is particularly adapted to manufacture the types of hose disclosed in the copending application Serial No. 48,476, filed August 9, 1960, entitled "Flexible Hose," now abandoned.

This type of hose includes a helical core strip 7, the convolutions of which are in contact with each other. The core strip 7 is provided with a central rib 8 so that, when the convolutions of the core strip 7 are in axial contact, the convolutions of the central rib 8 form therebetween a helical channel.

The core strip 7 is directed tangentially toward the mandrel 1 adjacent the guide helix 4 and is guided into a helical path by the face 6. At a point spaced from the guide helix 4 a plastic tape 9 is fed tangentially towards the mandrel 1 by a suitable guide means 10, so as to wrap about the core strip 7. Adhesive may be supplied by means, not shown, to the plastic tape 9 so that the plastic tape may be bonded to itself. The plastic bridges several convolutions of the core strip 7 so that it forms several laminations. The plastic tape 9 is sufficiently stretchable that when applied under tension it folds into the channel formed by the convolutions of the central rib 8.

At a suitable point near the extended end of the mandrel 1 is a pressure roller 11 carried by a suitable support 12 which bears against the hose, preferably in the channel formed between the convolutions of the rib 8 and the plastic tape 9 applied thereover.

Operation of the hose-making machine shown in FIGURES 1, 2, and 3 is as follows:

Initially, several convolutions of the core strip 7 and plastic tape 9 are hand wrapped about the mandrel 1 so as to fill the space between the guide helix 4 and the pressure roller 11. The support 12 is so arranged that the roller 11 may be moved aside for this purpose.

When the mandrel 1 is rotated, the pressure of the roller 11 places the portion of the core strip 7 between the roller 11 and the guide helix 4 under slight tension, causing the convolutions of the core strip 7 to constrict about the mandrel 1. The core strip, on constricting, is placed under further tension limited only by the resistance which may be applied to the tape 9 as it is fed tangentially to the mandrel 1. However, while the core strip 7 grips the mandrel tightly, so as to rotate therewith, it is capable of sliding axially so that as the mandrel 1 turns, the core strip 7 is forced axially by the helical face 6. Each convolution of the core strip 7 pushes the preceding convolution toward the free end of the mandrel 1.

The plastic tape 9 is placed under appropriate tension as the mandrel 1 rotates so as to conform to the core strip 7. The completed hose moves off the free end of the mandrel 1 and is suitably supported by a conventional cradle, not shown, which permits the completed end of the hose to rotate. When the desired length of hose has been completed, it is severed at a point beyond the mandrel 1, leaving the root end available to form a succeeding length of hose.

It should be observed that while the longitudinal knurls 3 aid in assuring a gripping connection between the core strip 7 and the mandrel 1, while at the same time permitting longitudinal movement, in some cases they may be omitted. If omitted, the gripping force of the several convolutions of the core strip 7 on the smooth mandrel 1 is utilized to ensure rotation of the core strip with the mandrel. Actually, some circumferential slippage may occur without harm.

Figure 4:
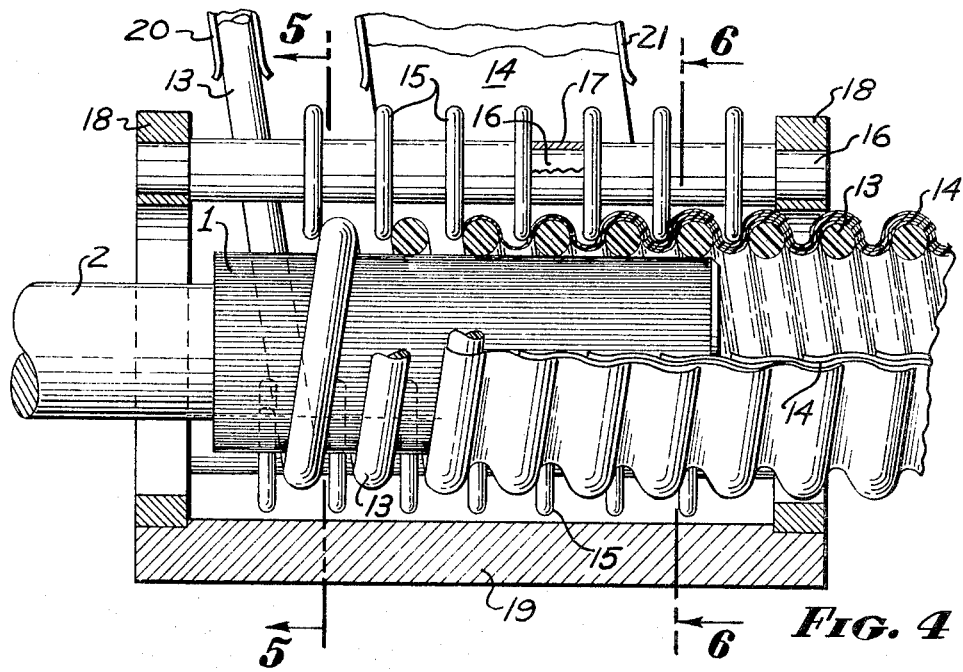
FIGURE 4 is a fragmentary, partial sectional, partial side view of a modified form of the hose-making machine also showing a hose in the process of manufacture, portions of the hose being broken away and in section.
Figure 5:
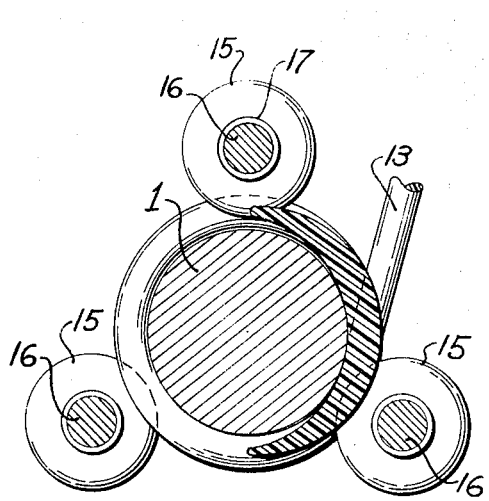
FIGURE 5 is a fragmentary, transverse, sectional view taken through 5—5 of FIGURE 4.
Figure 6:
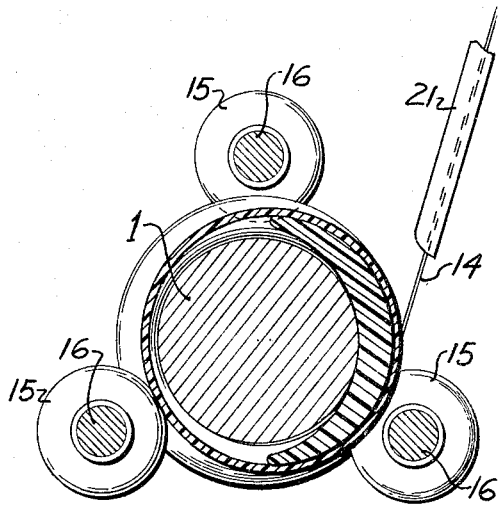
FIGURE 6 is a fragmentary, transverse, sectional view taken through 6—6 of FIGURE 4.

Reference is now directed to FIGURES 4, 5 and 6. The construction here illustrated may be utilized to manufacture hose of the type shown in FIGURES 1, 2, and 3, but for purposes of illustration is shown arranged to manufacture a hose comprising a hose core 13 of circular cross section, the convolutions of which are spaced, and a plastic tape 14, the plastic tape being similar to the plastic tape 9.

As in the first described structure, a mandrel 1 is employed which is cantilever supported by one end on a shaft 2. As in the first described structure, the mandrel may be provided with longitudinal knurls 3.

In place of the guide helix 4, sets of rollers 15 are utilized, so arranged as to define a helical path. The rollers are arranged in three sets and are mounted on three shafts 16. The members of each set are separated by spacers 17. The ends of the shafts 16 are journaled in ring frames 18, one ring frame being located immediately beyond the free end of the mandrel 1 and the other ring frame being located immediately beyond the shaft-supported end of the mandrel. The ring frames are mounted on a suitable support 19. The three sets of rollers 15 extend into proximity with the mandrel 1.

The hose core strip 13 and the plastic tape 14 are guided tangentially towards the mandrel 1 by suitable feed or guide means 20 and 21, respectively.

Operation of the hose-making machine shown in FIGURES 4, 5 and 6 is as follows:

Initially, the hose core 13 is hand wrapped about the mandrel in a helical path defined by the three sets of rollers 15. Similarly, the plastic tape 14 is hand wrapped about the hose core and is under sufficient tension so as to form a helical channel between the convolutions of the hose core.

The rollers towards the outboard or extended end of the mandrel 1 tend to bear axially against the helical rib formed by the plastic tape covered core and function in the manner of the pressure roller 11 of the first described structure. As a consequence, the hose core strip 13 tends to grip the mandrel 1 so as to rotate therewith, but is capable of being propelled axially by the rollers.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. A hose-making machine, comprising:
   (a) a drive shaft;
   (b) a mandrel extending coaxially from said shaft;
   (c) means for directing a first hose element tangentially onto said mandrel to wrap thereabout as said mandrel is rotated;
   (d) a fixed guide encircling said mandrel at its end adjacent said shaft, the inner periphery of the guide being contiguous to but clearing said mandrel, and its axial end directed toward the extended end of the mandrel forming a helical guide face;
   (e) said guide face having a helical pitch corresponding to the width of said first hose element to force said first hose element helically onto said mandrel with its convolutions in mutual contact, thereby to crowd said first hose element axially along said mandrel;
   (f) and means for entraining a second hose element on said first hose element for helical travel therewith.

2. In a hose-making machine comprising:
   (a) a drive shaft;
   (b) a mandrel having a driving connection at one end with said drive shaft and being free at its opposite discharge end;
   (c) means for supplying a hose forming element in the form of an elongated strip of plastic material of substantially uniform cross section along its length for winding along a helical path in helical convolutions about said mandrel, with its successive convolutions in edgewise contact;
   (d) means placing the length of said coiled hose element under tension and constricting the convolutions thereof about said mandrel to cause said hose element to rotate with and be wound upon said mandrel;
   (e) a fixed guide at the driven end of said mandrel having a bearing face extending contiguously along at least a portion of the circumference of said mandrel;
   (f) said guide face having a helical pitch corresponding to the winding pitch of said hose element on said mandrel and arranged to bear laterally against the first convolution of said hose element as it is wound on said mandrel with its convolutions in mutual contact and thereby to crowd said coiled hose element axially along said mandrel and off of the discharge end thereof during winding.

References Cited by the Examiner

UNITED STATES PATENTS 3,089,535  5/1963  Vohrer et al. _____ 156—143
3,173,822  3/1965  Rigaut _____ 156—429

FOREIGN PATENTS 220,633  1/1959  Australia.

EARL M. BERGERT, *Primary Examiner.*

R. J. CARLSON, P. DIER, *Assistant Examiners.*